(12) United States Patent
France et al.

(10) Patent No.: US 8,882,035 B2
(45) Date of Patent: Nov. 11, 2014

(54) CLASS DIVIDER

(76) Inventors: James Dominic France, Auckland (NZ);
Alistair Pilditch, Rolleston (NZ);
Maurice Trevor Benner, Auckland (NZ)

(*) Notice: Subject to any disclaimer, the term of this patent is extended or adjusted under 35 U.S.C. 154(b) by 475 days.

(21) Appl. No.: 13/011,433

(22) Filed: Jan. 21, 2011

(65) Prior Publication Data
US 2012/0025018 A1    Feb. 2, 2012

(30) Foreign Application Priority Data

Jan. 22, 2010 (AU) ................................ 2010900244
Jan. 25, 2010 (AU) ................................ 2010900279

(51) Int. Cl.
*B64D 11/06* (2006.01)
*B64D 11/00* (2006.01)

(52) U.S. Cl.
CPC ............ *B64D 11/0023* (2013.01); *Y02T 50/46* (2013.01)
USPC .................................. 244/118.6; 297/184.14

(58) Field of Classification Search
CPC ..... Y02T 50/46; B64D 11/06; B64D 11/0023
USPC ............. 244/118.6, 118.5, 129.4; 297/184.14
See application file for complete search history.

(56) References Cited

U.S. PATENT DOCUMENTS

| 5,577,358 | A  | * | 11/1996 | Franke ........................ 52/238.1 |
| 6,209,956 | B1 | * | 4/2001  | Dryburgh et al. ............. 297/245 |
| 7,448,574 | B2 |   | 11/2008 | Young et al. |
| D611,399  | S  |   | 3/2010  | Bock |
| D615,919  | S  |   | 5/2010  | Bock |
| 2007/0069073 | A1 |   | 3/2007  | Ferry et al. |
| 2007/0170310 | A1 | * | 7/2007  | Bock et al. ................. 244/118.5 |
| 2007/0246981 | A1 |   | 10/2007 | Plant |
| 2009/0200422 | A1 | * | 8/2009  | Johnson et al. ............. 244/118.5 |

* cited by examiner

*Primary Examiner* — Brian M O'Hara
(74) *Attorney, Agent, or Firm* — Dann, Dorfman, Herrell and Skillman, P.C.

(57) ABSTRACT

A class divider in an aircraft between a first seating arrangement that comprises of seats of a first kind and a second seating arrangement that comprises of seats of a second kind. The divider comprises a primary partition wall member that extends upwardly from cabin floor level and that is positioned facing said first seating arrangement and a secondary partition wall member that extends from divider contiguous portions of a seat of said second kind positioned in said second class. The seat of said second kind bridges space between the secondary partition wall member and the cabin floor.

41 Claims, 19 Drawing Sheets

CLASS DIVIDER

FIELD OF THE INVENTION

The present invention relates to a class divider for a passenger vehicle. More particularly but not exclusively it relates to class divider for at least partially dividing areas having different classes of seats in a passenger vehicle.

BACKGROUND OF THE INVENTION

Currently class dividers that exist between different classes of aircraft seat regions within an aircraft are substantially planar panels. They may be fabricated from a composite panel material and are provided with aluminium trim to facilitate the fastening of the panel to parts of the aircraft. Usually such panels are planar and their normal extends substantially parallel to the longitudinal direction of the plane. However aircraft seats in certain aircraft and in certain classes are no longer positioned in orthogonal directions relative to the aircraft body, but at angled directions. This can result in valuable space within in an aircraft not being utilised between such seats and any class dividers that may be adjacent to such seats. Furthermore where passenger space is desired to be increased, parts of the plane where in-flight entertainment features can be provided may also be restricted. Such components can also generate significant heat that needs to be easily dissipated and hence it may be undesirable to place such components in confined spaces.

It is an object of the present invention to provide a class divider that can offer improved space utilisation and/or at least partially ameliorates some of the abovementioned disadvantages or which at least provides the public with a useful choice.

BRIEF DESCRIPTION OF THE INVENTION

In a first aspect the present invention may be said to broadly consist A class divider in an aircraft that provides leg room for a passenger sitting in a seat in a first class of the aircraft and adjacent said class divider, into an adjacent second class of the aircraft, the class divider comprising;
- a first wall member that is positioned to face the second class and adjacent which a seat in said second class is placed, and
- a second wall member that is positioned facing said first class and adjacent which said passenger can be positioned when sitting in said seat, said second wall member and said first wall member defining a cavity therebetween,
- wherein at least one of said first and second wall members are of a configuration to (i) allow said seat in said second class to be contiguous said class divider, and (ii) allow at least the feet of the passenger to be located under the said seat in said second class.

Preferably the class divider extends from the cabin floor to at least 1.8 m above the cabin floor.

Preferably the first wall member has a lower edge that is of a shape to follow the contour of at least part of the seat in said second class and extends upwardly from the seat in said second class.

Preferably the interface between said lower edge and the seat in said second class forms a seal to said cavity.

Preferably the second wall member extends upwardly from the cabin floor.

Preferably the cavity is open at the top of the class divider.

Preferably the class divider is only single walled below the level of the interface of the lower edge and the seat in said second class.

In a further aspect the present invention may be said to be an aircraft that includes a class divider as herein before described.

In a further aspect the present invention may be said to be a class divider in an aircraft that provides leg room for a passenger sitting in a seat in a first class of the cabin of the aircraft and adjacent said class divider, into an adjacent second class of the aircraft where a seat in said second class is positioned contiguous said class divider, the class divider comprising;
- a primary partition wall member that extends upwardly from cabin floor level and that is positioned facing said first class and adjacent which said passenger can be positioned when sitting in said seat in said first class,
- a secondary partition wall member that extends from divider contiguous portions of said seat in said second class,
- wherein the primary partition wall member is adapted and configured to allow at least the feet of the passenger to pass there through to be located under the said seat in said second class, the seat in the second class bridging space between the secondary partition wall member and the cabin floor.

Preferably said secondary partition wall member that extends upwardly from divider contiguous portions of said seat in said second class.

Preferably the secondary partition wall member extends to the same height as the primary partition wall member.

In a further aspect the present invention may be said to be a aircraft that includes a class divider as herein before described.

In a further aspect the present invention may be said to be a class divider in an aircraft between a first seating arrangement that comprises of seats of a first kind and a second seating arrangement that comprises of seats of a second kind, comprising
- a primary partition wall member that extends upwardly from cabin floor level and that is positioned facing said first seating arrangement,
- a secondary partition wall member that extends from divider contiguous portions of a seat of said second kind positioned in said second class,
- wherein the seat of said second kind bridges space between the secondary partition wall member and the cabin floor.

Preferably said secondary partition wall member extends upwardly from divider contiguous portions of a seat of said second kind positioned in said second class.

Preferably said primary and secondary partitions wall members define a cavity there between that is open to the cabin above the class divider.

Preferably the primary and secondary partition wall members are spaced less than 500 mm apart.

In a further aspect the present invention may be said to be a class divider for dividing adjacent seating areas of a passenger vehicle having different types of seats or seating arrangements, said class divider comprising
- a first wall member, and
- a second wall member secured or securable to the first wall member.

Preferably at least part of the first wall member is to be mounted further to the front of the vehicle than the second wall member.

Preferably the first wall member at least partly defines a concave forward facing surface when viewed from above.

Preferably the second wall member at least partly defines a convex rear facing surface when viewed from above.

Preferably the forward facing surface of the first wall member and the convex rear facing surface of the second wall members are substantially parallel.

Preferably the class divider includes a support frame at least partially extending between the first wall member and the second wall member.

Preferably the support frame is for supporting one or more selected from said first wall member and said second wall member.

Preferably the first wall member and second wall member are secured or securable to each other by securing fasteners.

Preferably the securing fasteners are integrally moulded formations moulded into one or more selected from the first wall member and the second wall member.

Preferably the securing fasteners are one or more selected from the group of snap fit-, clip fit-, screw fit-, threaded-, or bayonet-type formations.

Preferably at least part of the divider follows at least partially the contour of contiguous parts of an adjacent seating arrangement disposed at the front side of the divider.

Preferably at least part of the divider follows at least partially the contour of contiguous parts of an adjacent seating arrangement disposed at the rear side of the divider.

Preferably the first and second wall members at least partially enclose a cavity between them.

Preferably the cavity includes or provides passages for the installation of cabling.

Preferably the wall member(s) are composed of plastic.

Preferably the wall members are moulded.

Preferably the class divider includes a plinth formation on which one or more of the first wall member, the second wall member and the support frame are directly or indirectly mounted or mountable.

Preferably the plinth formation includes a pedestal formation suitable for mounting of and presenting for use by a passenger, a monitor and/or a tray table arrangement.

Preferably, in use, the pedestal formation is located adjacent the aisle.

Preferably the pedestal formation is, in use, associated with one or more seats or seating arrangements.

Preferably the pedestal formation is located to be in use adjacent to a headstrike zone for the seat or seating arrangement that the pedestal formation is associated with.

Preferably a tray table arrangement is mounted or mountable on the pedestal formation for presentation to passenger.

Preferably a monitor is mounted or mountable on the pedestal formation for presentation to passenger.

Preferably in-flight entertainment controls and accessories are mounted on the pedestal formation.

Preferably the pedestal formation is mounted in a configuration allowing access by a passenger to an aisle seat disposed behind the divider arrangement.

Preferably the class divider includes seat track attachment formations for securing the class divider to seat tracks of an aircraft.

Preferably the seat track attachment formations are mounted to the plinth formation.

Preferably the class divider includes bin rail attachment formations for attaching the class divider to overhead bin rails of an aircraft.

Preferably the class divider includes a floor proximity light fitting for providing floor proximity lighting for guiding passengers along an aisle alongside the divider arrangement.

Preferably one or both of the first wall member and the second wall member is adapted and configured for structurally supporting the divider arrangement.

Preferably the class divider includes an in-use light fitting for providing an indication that a proximately located facility is in use.

Preferably the class divider includes support formations suitable for supporting a bassinet.

Preferably the class divider includes a bassinet.

Preferably the bassinet is pivotally coupleable to one or more of
  the first wall member,
  the second wall member,
  the support frame.

Preferably the bassinet is supported by the support frame.

Preferably the bassinet is moveable between
  a stowed position in which it is stowed out of the way of passengers seated behind the divider arrangement, and
  a folded out position in which it is capable of supporting a sleeping infant.

Preferably the bassinet is pivotally coupleable to one or more of the first wall member, the second wall member, and the support frame in a removable manner.

Preferably the class divider defines one or more selected from a recess, a cut-out and an aperture, suitable for receiving at least part of the legs of a passenger seated in an adjacent seating arrangement disposed behind (i.e. in a rearward more position in the vehicle) the divider arrangement, to allow a passengers legs to be located in said recess, a cut-out or aperture.

Preferably at least partially extended underneath the seating arrangement in front of the class divider and/or into or through said aperture and/or into or through said one or more selected from a recess, a cut-out and an aperture.

Preferably the said one or more selected from a recess, a cut-out and an aperture extends upwards from floor level.

Preferably the said one selected from a recess, cut-out or aperture is disposed in an offset fashion towards one side of the divider arrangement.

Preferably the class divider includes a monitor for passenger entertainment and information.

Preferably the monitor includes one or more selected from
  a Liquid Crystal display (LCD) screen
  a plasma screen monitor screen, and
  an Organic Light Emitting Diode (OLED) screen,
  a three dimensional display screen.

Preferably the monitor is pivotally mounted to one of the first wall member and the second wall member.

Preferably the monitor is pivotally mounted to move about at least two axes of rotation.

Preferably the class divider includes one or more selected from:
  an electrical power supply socket
  a data connection socket.

Preferably the data connection socket is a USB socket.

Preferably the electrical power supply socket is adapted and configured for supplying one or both of DC voltage and AC voltage.

Preferably the class divider includes a tray table supported by one of said first and second wall members moveable between:
  a deployed position in which it is usable by a passenger as a support for items, and
  a stowed position in which the tray table is stowed in a position less intrusive to a passenger.

Preferably the tray table is pivotally mounted or mountable to one of the first wall member and the second wall member.

In a further aspect the present invention may be said to be a class divider for dividing adjacent seating areas of a passenger vehicle having different types of seating arrangements, said class divider carrying a tray table movably supported relative said class divider in a manner to move between:

a deployed position, in which the tray member is usable by a passenger adjacent said class divider as a support for items, and a stowed position in which the tray member is stowed in a position less intrusive to a passenger adjacent said divider arrangement.

Preferably the class divider further comprises a wall member that provides partitioning between said adjacent seating areas and that defines a recess into which said tray table is received when in its stowed position so as to be substantially recessed into said recess.

Preferably the wall member comprises a first wall member that is has a face side that is concave when viewed from above and a second wall member that has a face side that is convex when viewed from the above.

Preferably the tray table is pivotally mounted to the second wall member.

Preferably the first and second wall members at least partially enclose a cavity between them.

Preferably the cavity includes, or provides passages for the installation of, cabling.

Preferably the wall members are composed of plastic.

Preferably the wall members are moulded.

Preferably the class divider includes a plinth formation on which one or more of the first wall member, the second wall member and the support frame are directly or indirectly mounted or mountable or integrally formed.

Preferably the plinth formation includes a pedestal formation suitable for mounting of a monitor and/or a tray table arrangement.

Preferably the class divider defines one or more selected from a recess, a cut-out and an aperture, suitable for receiving at least part of the legs of a passenger seated in an adjacent seating arrangement disposed behind (i.e. in a rearward more position in the vehicle) the divider arrangement, to allow a passengers legs to be at least partially extended underneath the seating arrangement in front of the class divider and/or into or through said one or more selected from a recess, a cut-out and an aperture.

In a further aspect the present invention may be said to be a class divider for dividing adjacent seating areas of a passenger vehicle, said class divider comprising a first wall member and a second wall member defining a cavity there between, a monitor for displaying visual passenger entertainment and information wherein the cavity includes defines or provides at least one passage for cabling for said monitor, and wherein the cavity includes at least one opening located above where the monitor is located.

Preferably it is for dividing adjacent seating areas of a passenger vehicle having different types of seating arrangements.

Preferably at least part of the divider follows at least partially the non-linear contours of an adjacent seating arrangement disposed in front of it.

Preferably the class divider defines one or more selected from a recess, a cut-out and an aperture, suitable for receiving at least part of the legs of a passenger seated in an adjacent seating arrangement disposed behind (i.e. in a rearward more position in the vehicle) the class divider, to allow a passengers legs to be at least partially extended underneath the seating arrangement in front of the class divider and/or into or through said one or more selected from a recess, a cut-out and an aperture.

Preferably the said one or more selected from a recess, a cut-out and an aperture extends upwards from floor level.

Preferably said cabling extends from said monitor and out through a lower aperture of said cavity to below the floor of the cabin in which the class divider is located.

Preferably other components of a in flight entertainment system to which said monitor is connected are located in said cavity and to which said cabling is connected.

Preferably the monitor includes one or more selected from
a Liquid Crystal display (LCD) screen
a plasma screen monitor screen, and
an Organic Light Emitting Diode (OLED) screen,
a three dimensional display screen.

Preferably at least part of the divider follows at least partially the non-linear contours of an adjacent seating arrangement disposed in front of it.

In yet a further aspect the present invention may be said to be a class divider for dividing adjacent seating areas of a passenger vehicle having different types of seating arrangements, said class divider comprising a first wall member that defines one or more selected from a recess, a cut-out and an aperture, suitable for receiving at least part of the legs of a passenger seated in an adjacent seating arrangement disposed behind (i.e. in a rearward more position in the vehicle) the divider arrangement, to allow a passengers legs to be at least partially extended underneath the seating arrangement in front of the class divider and/or into or through said one or more selected from a recess, a cut-out and an aperture.

Preferably the said one or more selected from a recess, a cut-out and an aperture extends upwards from floor level.

Preferably the class divider comprises a second wall member secured to the first wall member.

Preferably the first wall member is mounted forward of the second wall member.

Preferably the first and second wall members have complementary nesting curved (when viewed from above) shapes respectively.

Preferably at least part of the divider follows at least partially the contours of an adjacent seating arrangement disposed in front of it (i.e. in an advanced more location in a vehicle).

Preferably at least part of the divider follows at least partially the non-linear contours of an adjacent seating arrangement disposed in front of it.

Preferably the first and second wall members at least partially enclose a cavity between them.

In yet a further aspect the present invention maybe said to be an aircraft that includes a class divider as herein before described.

An aircraft that includes in its passenger cabin space (a) a pair of adjacent seating arrangements on each side of the centreline of said aircraft, each capable of being converted between a condition allowing a passenger to be sedentary and a condition allowing a passenger to lie down such that adjacent passengers lying down in their respective said seat seating arrangements extend in a body length wise direction in a "V" shaped configuration relative each other and each at an equal angle relative to the centreline of the aircraft, and (b) a class divider cupping at least part of the rear portions of said pair of said seat arrangements.

Preferably the class divider is as herein above described.

In yet a further aspect the present invention may be said to be an aircraft that includes in its passenger cabin space (a) a seating arrangement capable of being converted between a condition allowing a passenger to be sedentary and a condition allowing a passenger to lie down such that said passenger lying down extends in a body length wise direction at and angle to the longitudinal direction of said aircraft, and (b) a class divider cupping at least part of the rear portions of said of said seating arrangement.

Preferably the class divider is as herein above described.

In a further aspect the present invention may be said to be a herringbone seating arrangement in an aircraft at least in part separated from an adjacent seating arrangement aft of the herringbone seating arrangement by class divider the class divider cupping about and to the rear of at least part of two of immediately adjacent said seats in said herringbone seating arrangement.

In a further aspect the present invention may be said to be class divider on an aircraft to provide a partition between two different seating arrangement zones in the aircraft, said divider being substantially "V" or "U" shaped in plan view and configured to cup at least partially about two adjacent seats in the rear row of the forward more seating arrangement zone.

Other aspects of the invention may become apparent from the following description which is given by way of example only and with reference to the accompanying drawings.

As used herein the term "and/or" means "and" or "or", or both.

As used herein "(s)" following a noun means the plural and/or singular forms of the noun.

For the purposes of this specification, the term "plastic" shall be construed to mean a general term for a material comprising of any of a wide range of synthetic or semisynthetic polymerization products, and generally consisting of, but not limited to, a hydrocarbon-based polymer, and also includes materials generally regarded by the public as being "plastic".

Where reference herein is made to first class and second class it is to denote two classes that are different from each other.

The term "comprising" as used in this specification means "consisting at least in part of". When interpreting statements in this specification which include that term, the features, prefaced by that term in each statement, all need to be present but other features can also be present. Related terms such as "comprise" and "comprised" are to be interpreted in the same manner.

The entire disclosures of all applications, patents and publications, cited above and below, if any, are hereby incorporated by reference.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

BRIEF DESCRIPTION OF THE DRAWINGS

The invention will now be described by way of example only and with reference to the drawings in which.

DETAILED DESCRIPTION OF THE INVENTION

Figure 1:
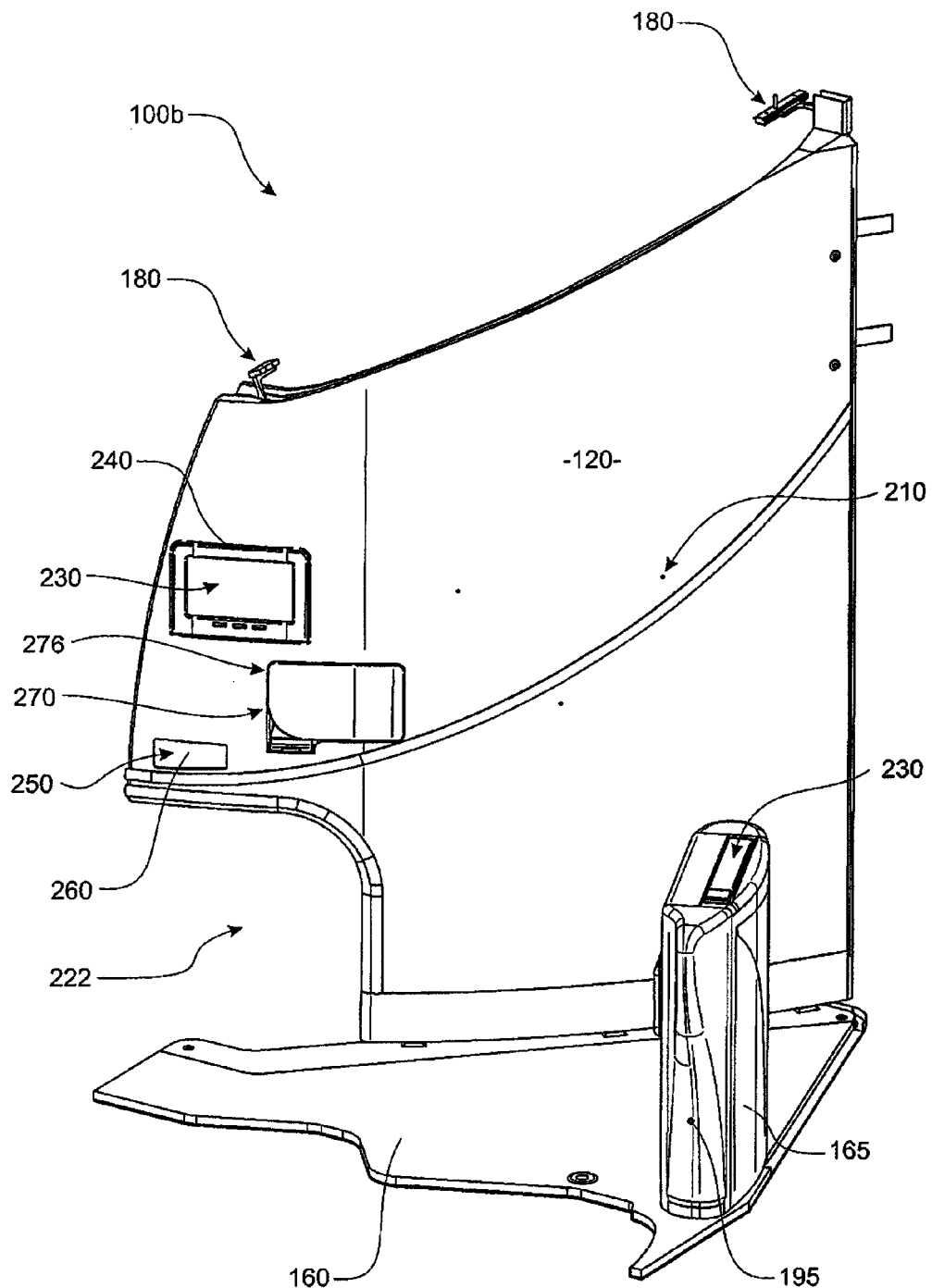
FIG. 1: shows a top rear perspective view of an outboard class divider.
Figure 2:
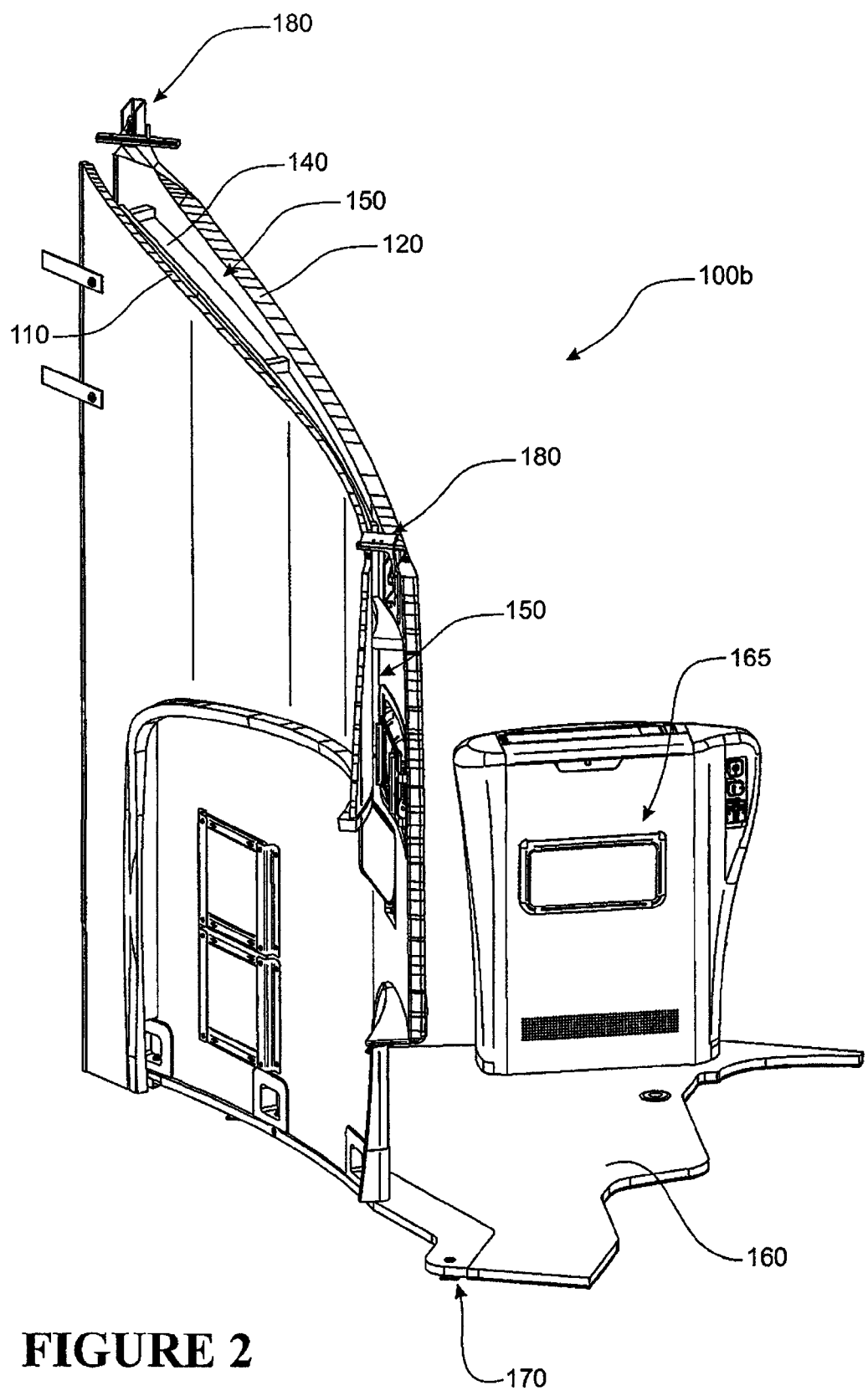
FIG. 2: shows a top side perspective view of an outboard class divider of FIG. 1.
Figure 3:
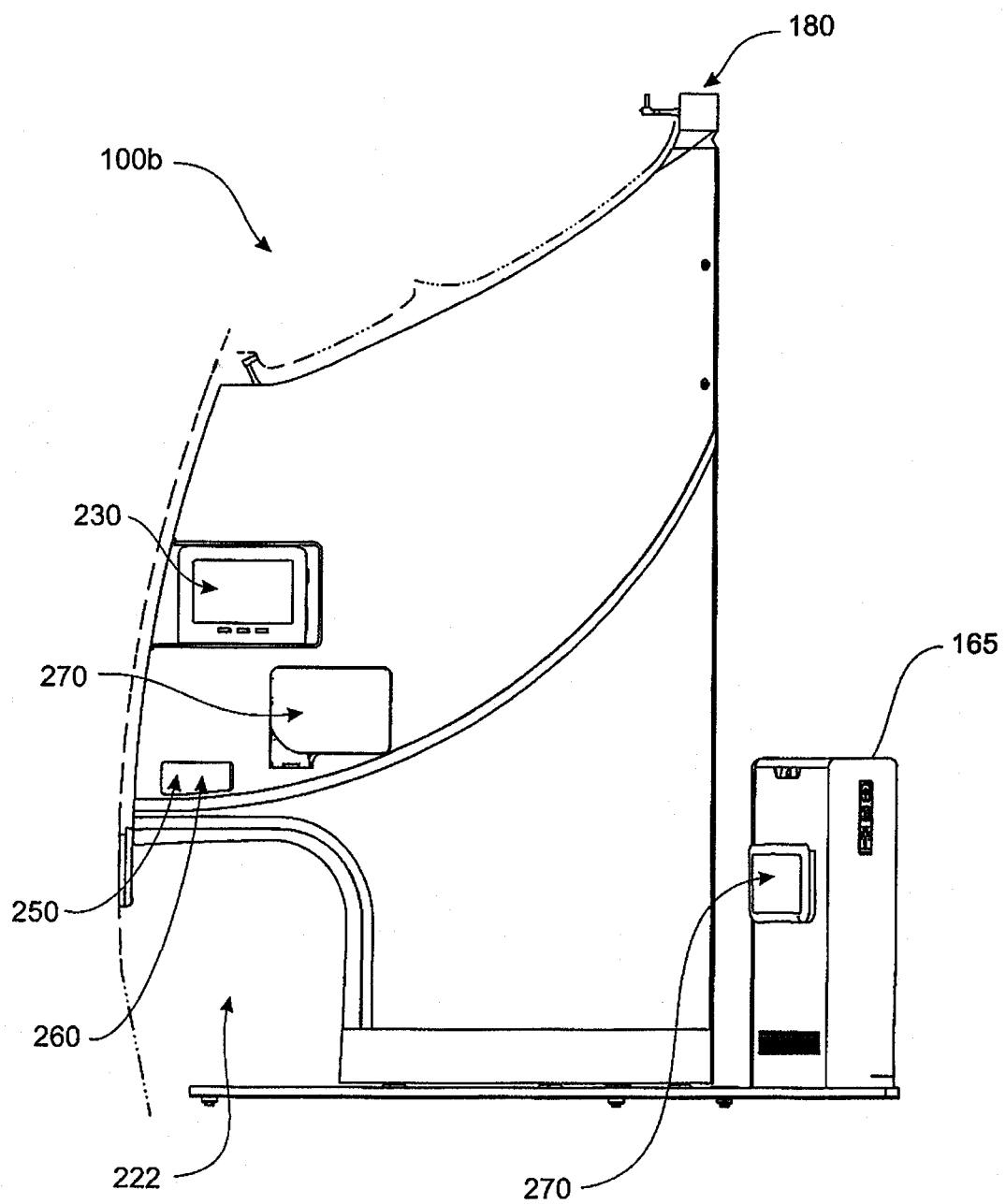
FIG. 3: shows a rear elevation view of an outboard class divider of FIG. 1.
Figure 4:
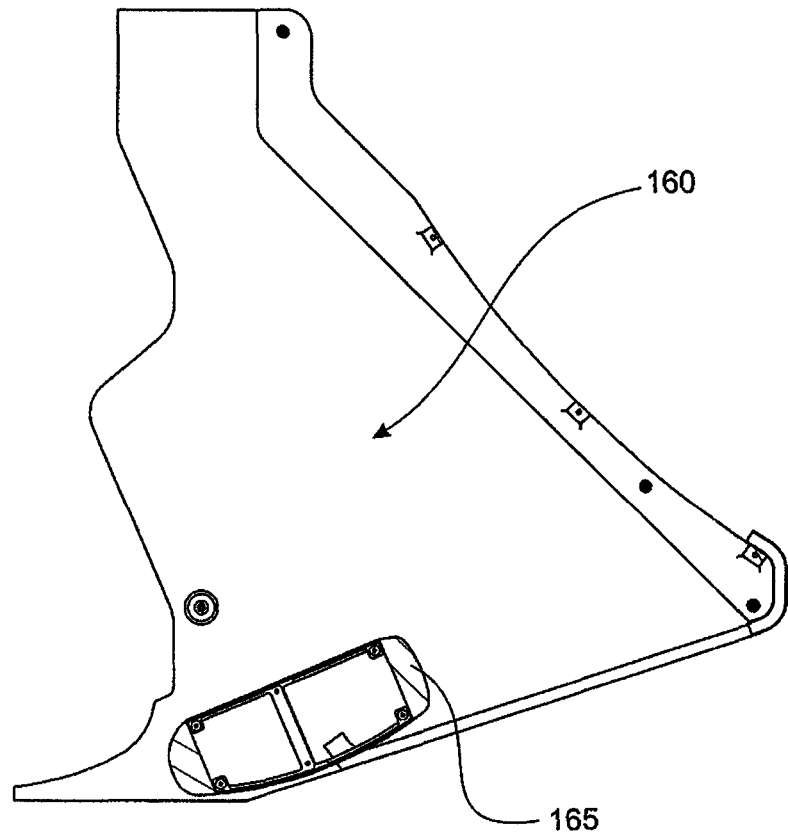
FIG. 4: shows a shows a plan view of a plinth formation through view E-E of FIG. 5.
Figure 5:
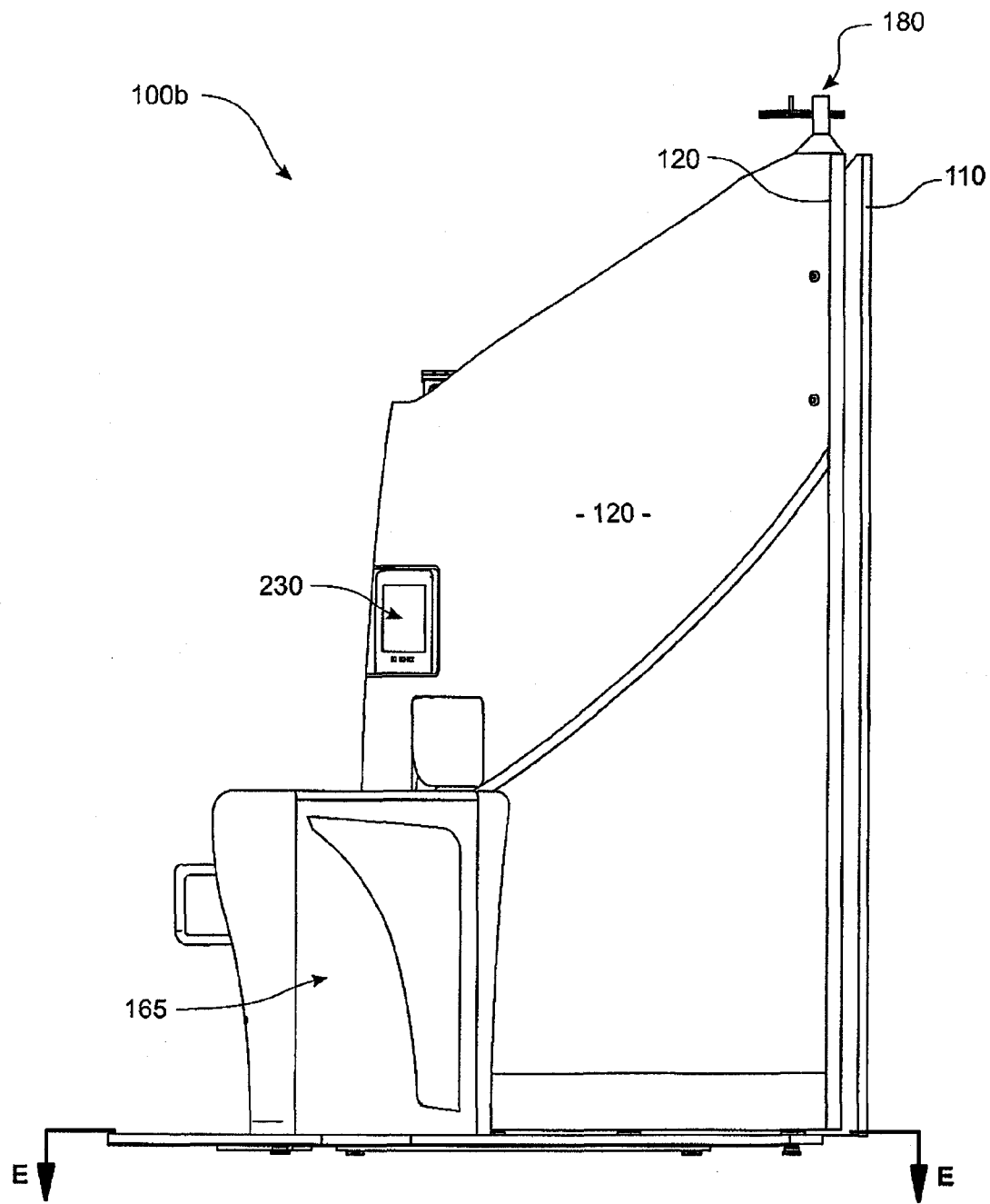
FIG. 5: shows a side elevation view of an outboard class divider of FIG. 1.
Figure 6:
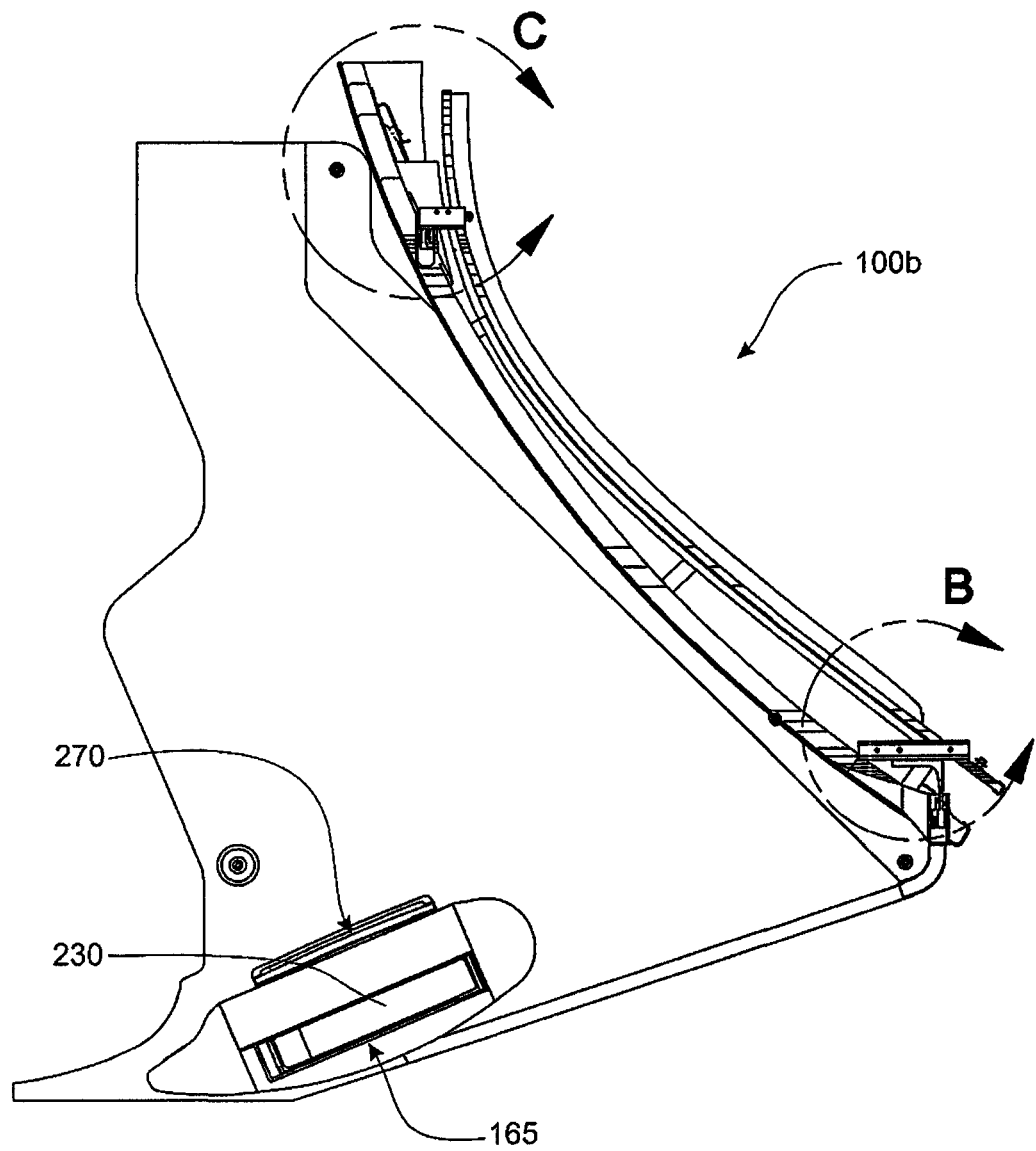
FIG. 6: shows a plan view of an outboard class divider of FIG. 1.
Figure 8:
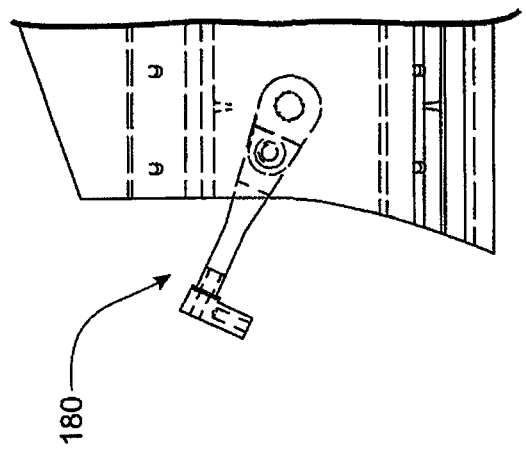
FIG. 8: shows a side view of FIG. 7 showing bin rail attachment fittings.
Figure 7:
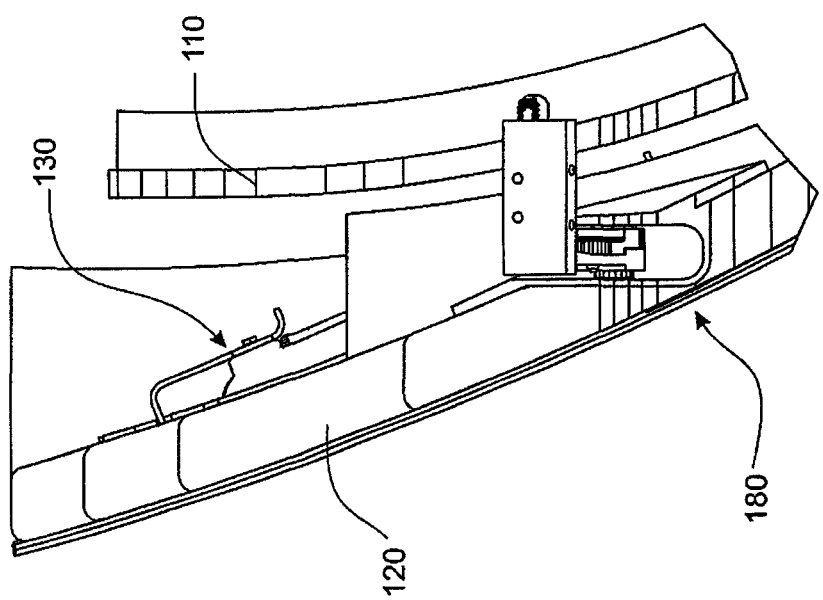
FIG. 7: shows detail C of FIG. 6, including upper attachment details.
Figure 10:
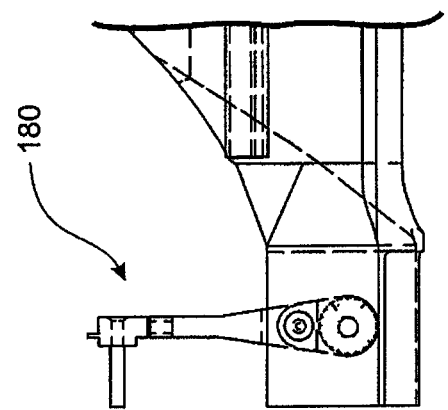
FIG. 10: shows a side view of FIG. 9 showing bin rail attachment fittings.
Figure 9:
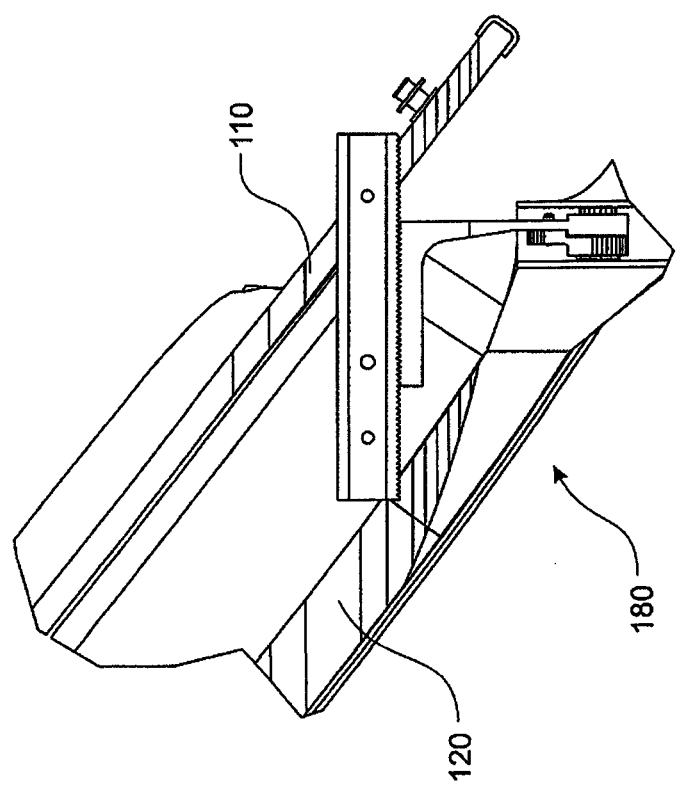
FIG. 9: shows detail B of FIG. 6, including upper attachment details.
Figure 11:
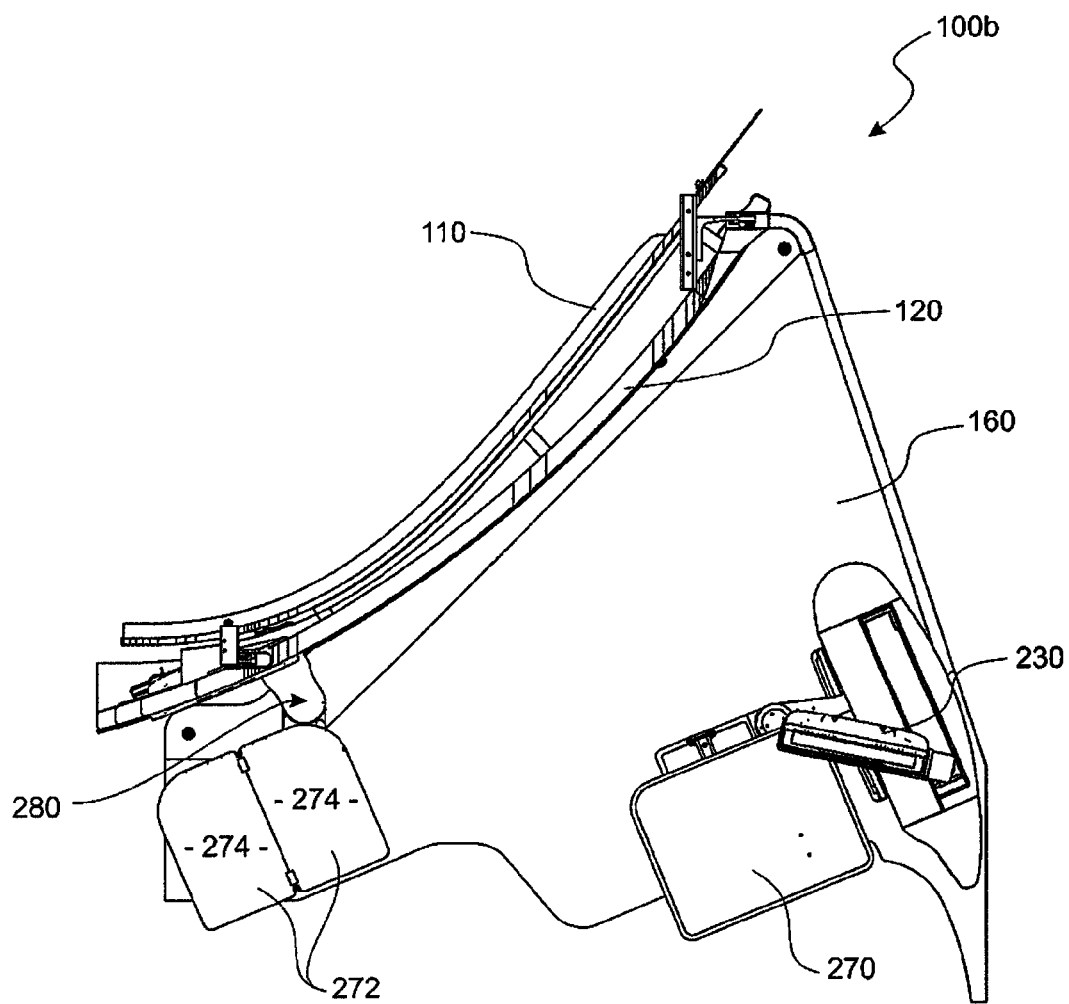
FIG. 11: shows a plan view of an outboard class divider of FIG. 1, showing deployment of tray table arrangements and monitor.

With reference to the above drawings, in which similar features are generally indicated by similar numerals, a class divider according to a first aspect of the invention is generally indicated by the numeral 100.

In one embodiment now described, there is provided a class divider 100 for dividing adjacent seating areas of a passenger vehicle having different types of seats or seating arrangements. The class divider 100 comprises a first wall member 110 located towards the front of the vehicle such as an aircraft, and a second wall member 120 located rearwardly of the first wall member 110. Both the first wall member 110 and the second wall member 120 are made of plastic in a moulding or forming process. Such may include a blow moulding, injection moulding, or any other similar suitable moulding process. The first wall member and the second wall member are secured or securable to each other each other by means of securing fasteners 130. It is envisaged that at least one or both of the first wall member and the second wall member will be relatively thick, to be able to offer a reasonable amount of rigidity to the class divider 100 to structurally support it.

However, in a preferred embodiment, the class divider 100 can also include a support frame 140 that extends between the first wall member 110 and the second wall member 120 to hold them together, support them, and to provide rigidity to the class divider 100.

In one embodiment it is envisaged that the securing fasteners 130 can be integrally moulded formations (not shown) moulded into one or both of the first wall member 110 and the second wall member 120. Alternately they could be snap fit-, clip fit-, screw fit-, threaded-, or bayonet-type formations.

The preferred embodiment of the class divider will follow the contours of part of the seating arrangement in front of it, to help ensure that no redundant space is exists between the seating arrangement 501a&b in front and the dividers.

Figure 12A:
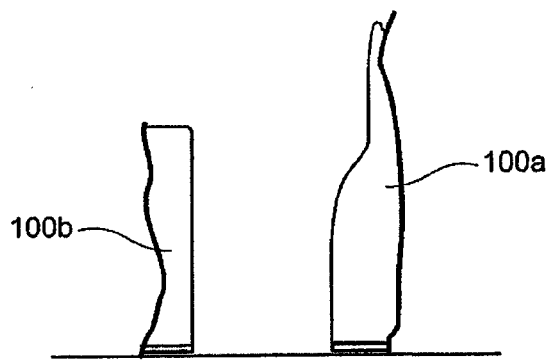
FIG. 12a: shows a rear view of the differing widths between the inboard and outboard class dividers of FIG. 12b.
Figure 12B:
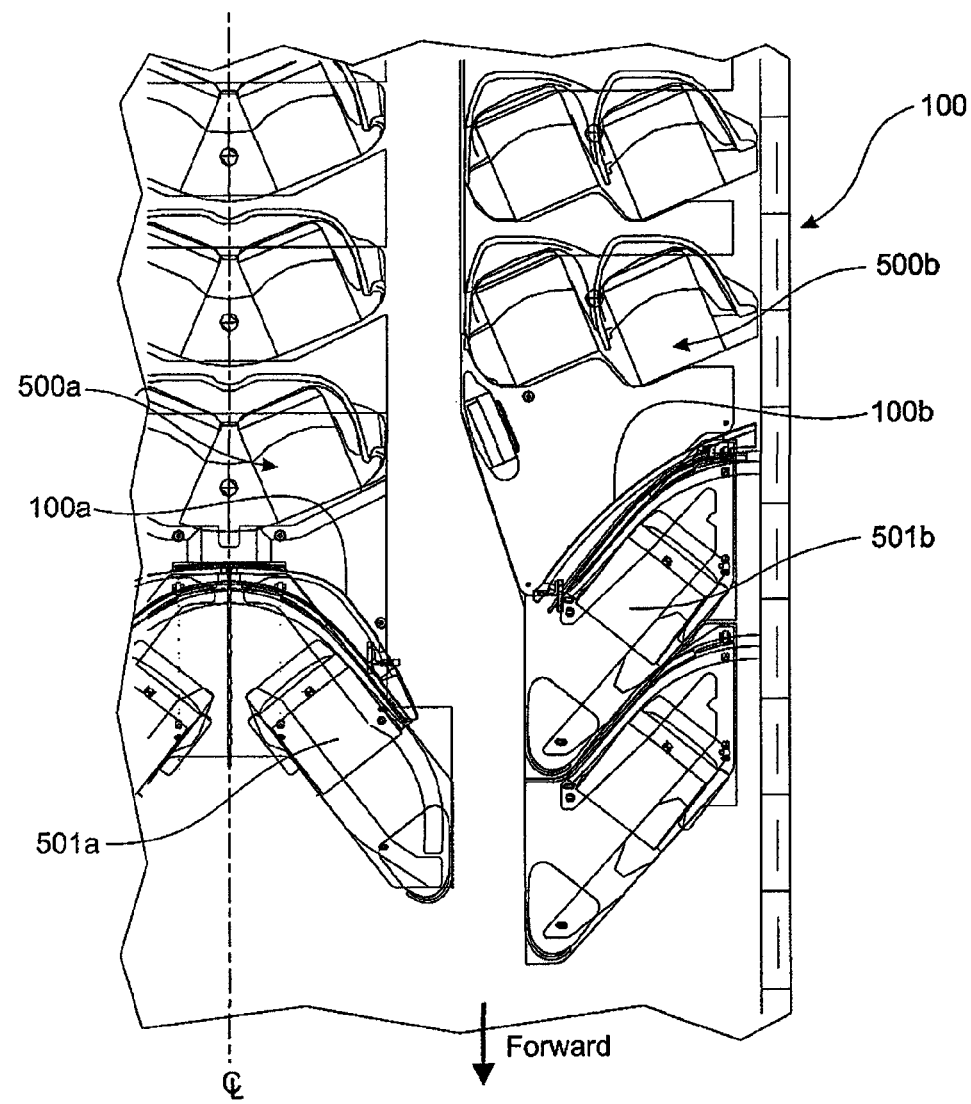
FIG. 12b: shows a plan view of an aircraft cabin including inboard and outboard class divider.
Figure 13:
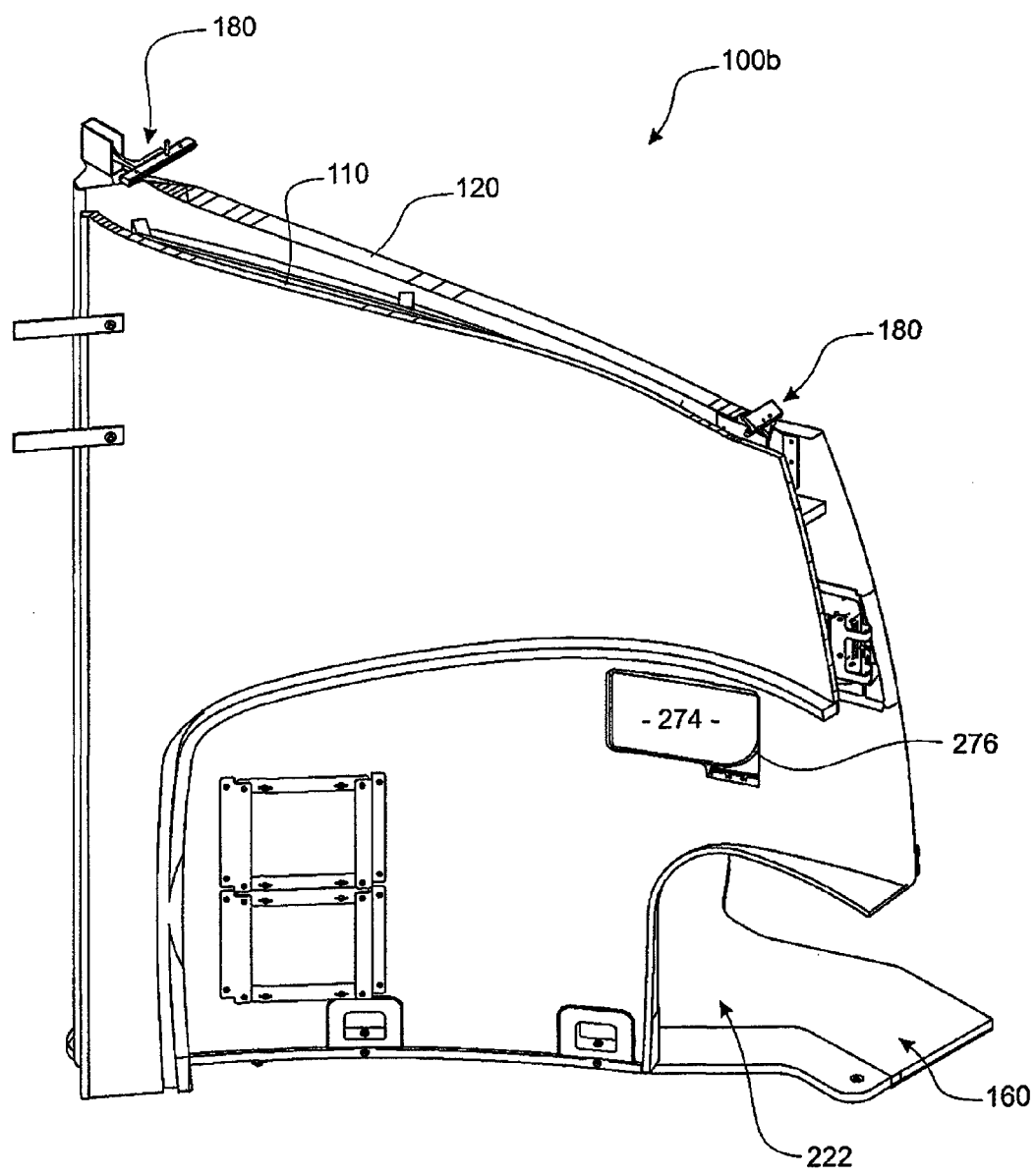
FIG. 13: shows a front top perspective view of the outboard class divider of FIG. 1.

In the embodiments shown in the figures, two versions of the class divider 100 are envisaged. One version of the divider arrangement, the inboard class divider 100a as shown in FIGS. 14-24 will surround and follow the contours of the rear of an inboard seating arrangement 501a disposed towards the inboard of the aircraft, while the other version of the divider arrangement, the outboard class divider 100b as shown in FIGS. 1-13, will follow the contours of the rear of an outboard seating arrangement 501b disposed towards the outboard of a passenger vehicle. Both versions may cooperate and be positioned adjacent each other as shown in FIG. 12b there together they define a substantial partition between two classes of the aircraft.

In one preferred embodiment as shown in the figures, the first wall member 110 and second wall member 120 of the class dividers 100a&b define complementary concave and convex wall shapes respectively when viewed from the top as they extend around the contours of their respective seating arrangements 501a&b. The first wall member 110 is mounted forward of the second wall member 120, with the first wall member defining a concave forward facing curve when viewed from above, and the second wall member defines a convex forward facing curve when viewed from the rear. In this way, the first wall member 110 and second wall member 120 have complementary nesting concave and convex shapes respectively.

However it is envisaged that in an alternative embodiment, the shape of the first wall member 110 and/or the second wall member 120 could include concave formations, as well as any other three dimensional complex curves in order to follow non-linear contours of an adjacent seating arrangement disposed in front of it (i.e. in an advanced more location in a vehicle).

The first wall member 110 and second wall members 120 enclose a cavity 150 between them. This cavity may also be continued by parts of the seat located in a contiguous manner adjacent the divider.

Figure 15:
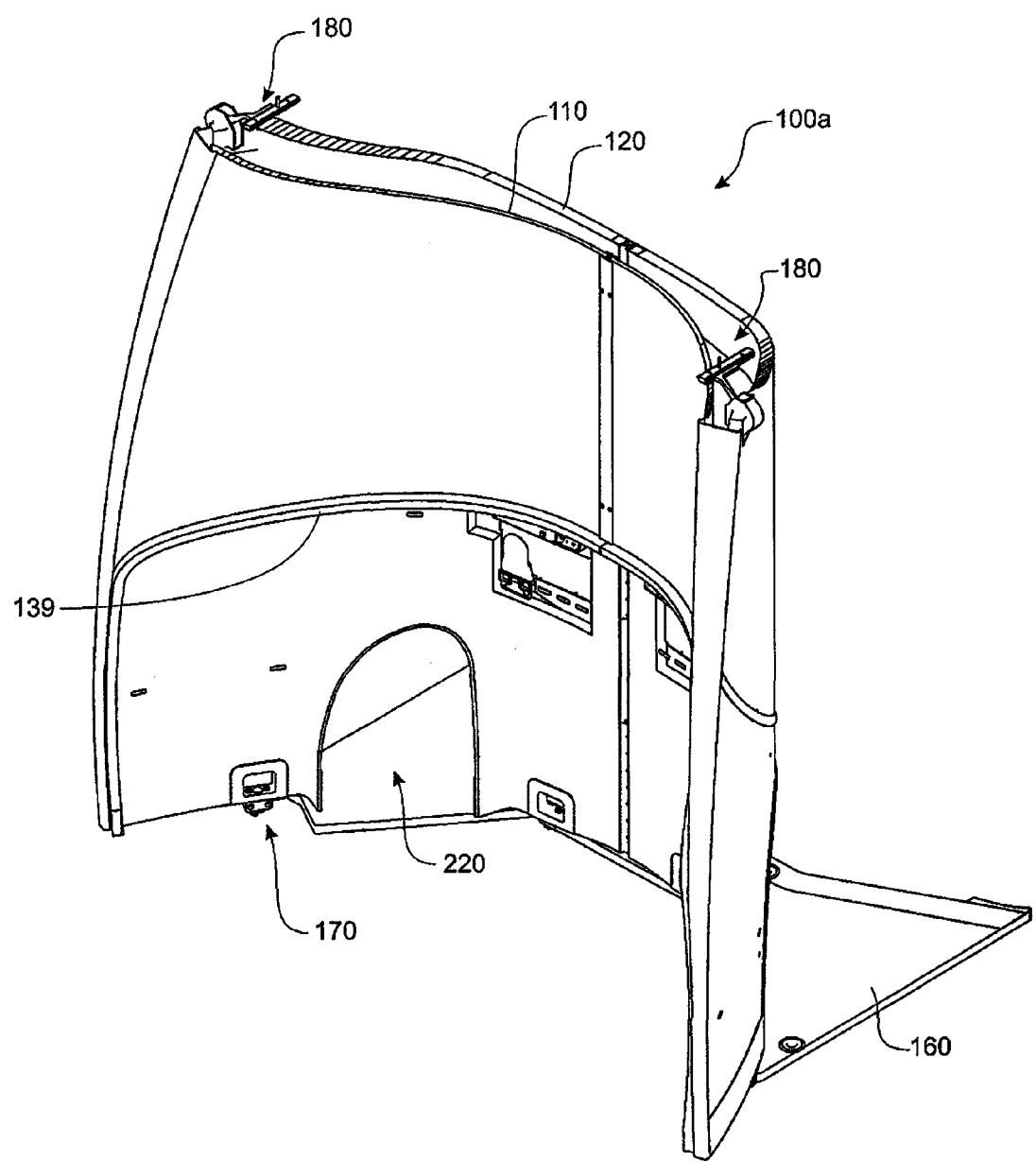
FIG. 15: shows a top front perspective view of an inboard class divider of FIG. 14.
Figure 16:
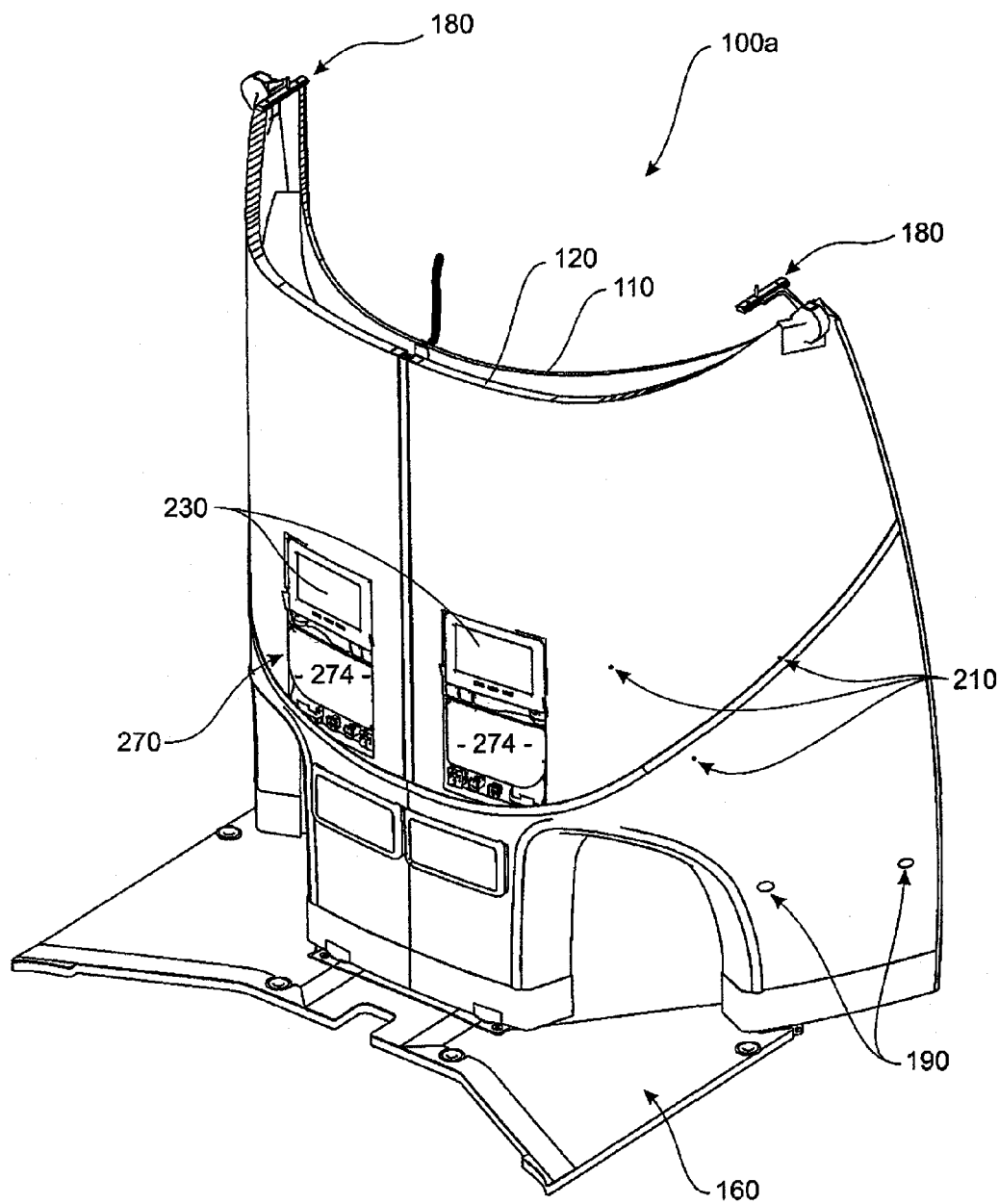
FIG. 16: shows a top rear perspective view of an inboard class divider of FIG. 14 including avionics cabling routing.
Figure 17:
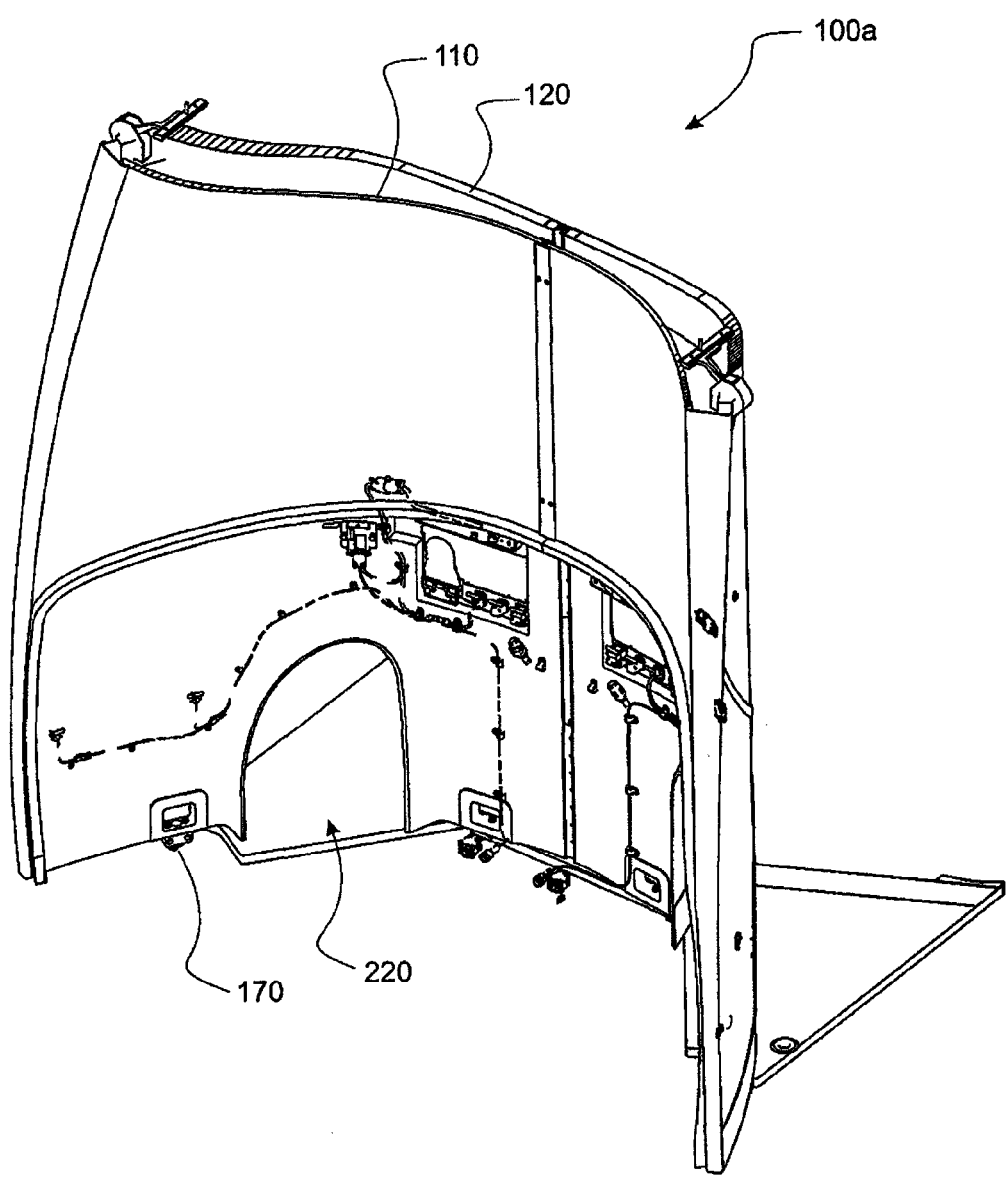
FIG. 17: shows a top front perspective view of an inboard class divider of FIG. 14 including avionics cabling routing.
Figure 18:
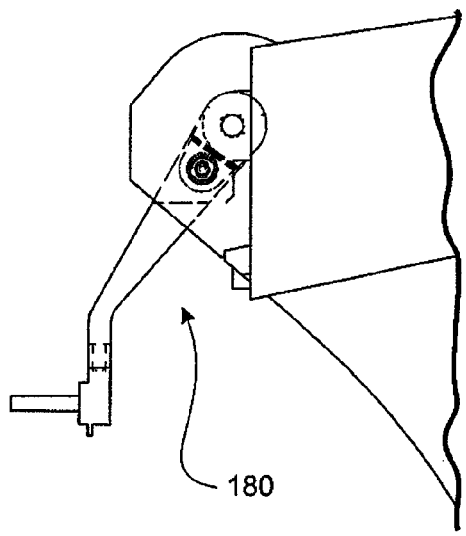
FIG. 18: shows a side view of FIG. 20.
Figure 19:
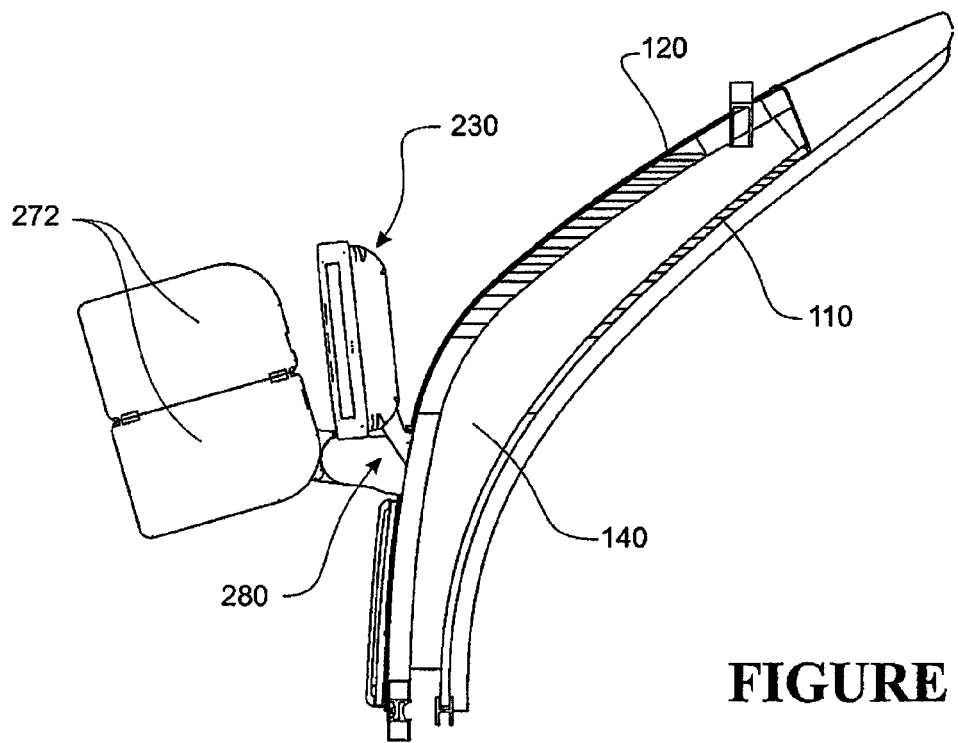
FIG. 19: shows a plan view of an inboard class divider of FIG. 14, showing deployment of monitor and tray table arrangement.
Figure 20:
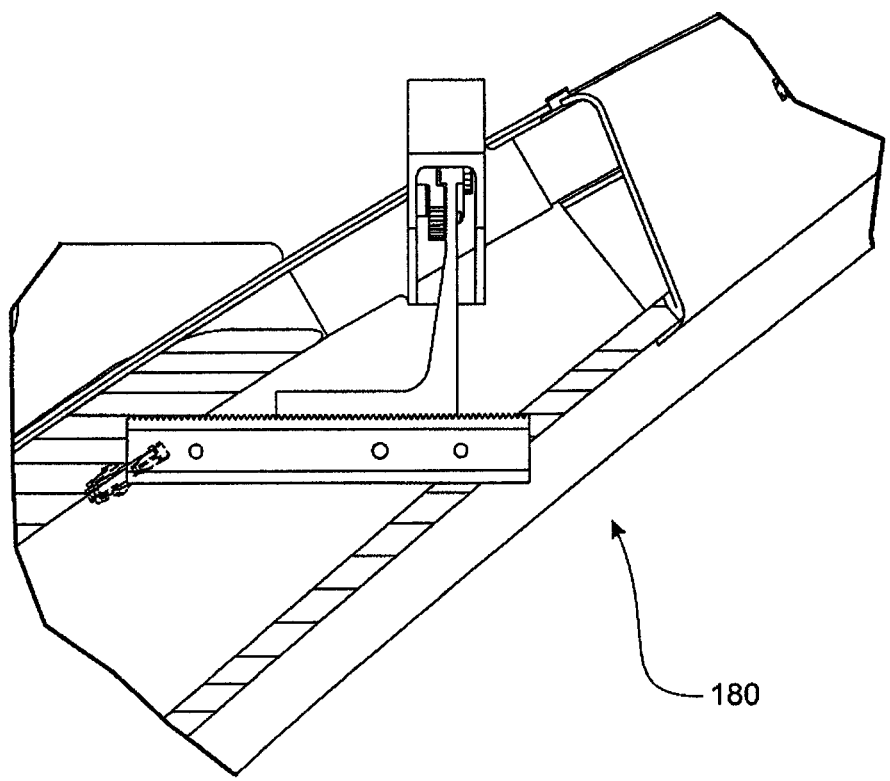
FIG. 20: shows detail B of FIG. 21, showing upper bin rail attachment details.
Figure 21:
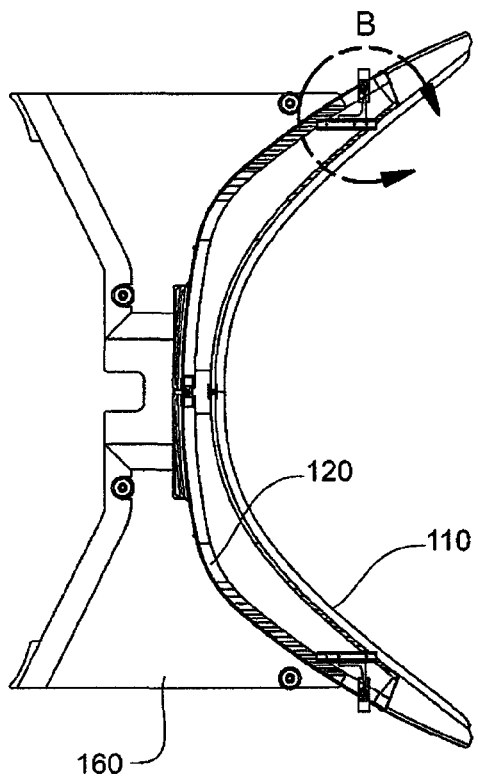
FIG. 21: shows a plan view of an inboard class divider of FIG. 14.
Figure 22:
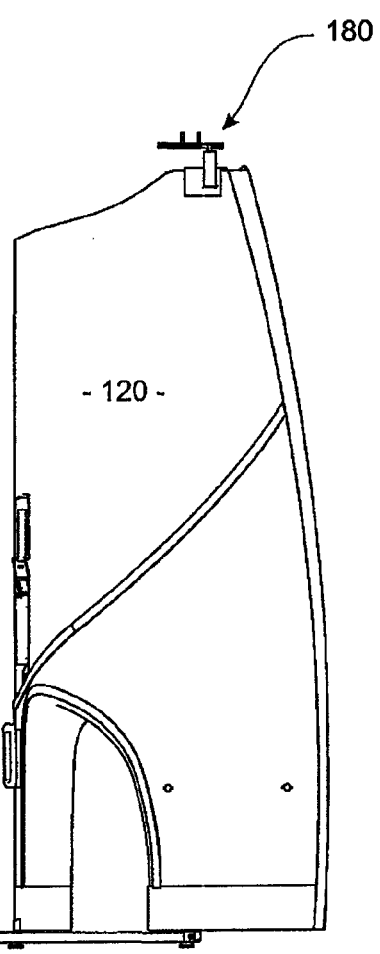
FIG. 22: shows a side elevation view of an inboard class divider of FIG. 14.
Figure 23:
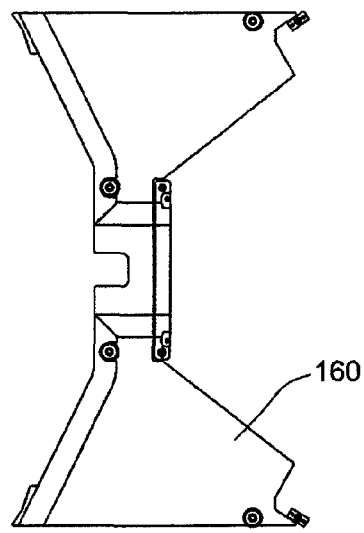
FIG. 23: shows a view of section K-K of FIG. 24.
Figure 24:
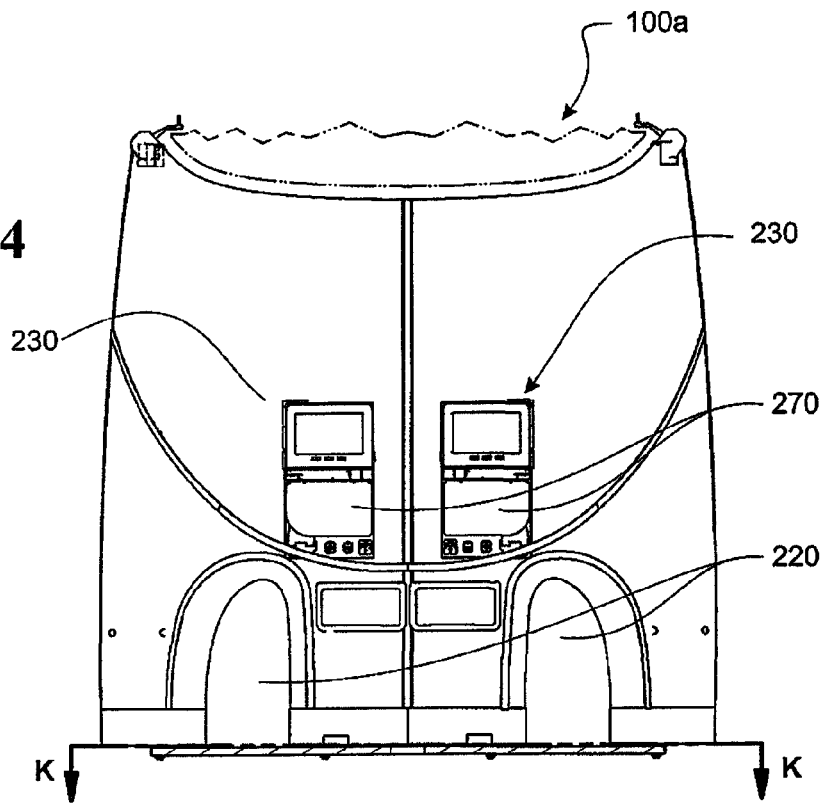
FIG. 24: shows a front cutaway elevation view of an inboard class divider of FIG. 14.

As seen in FIG. 15 a lower edge 139 of the first wall member is preferably contoured to create an interface with the seat (not shown) in front. The seat in front fills the gap between the first wall member and the cabin floor. This means that the first wall member does not need to be of the same vertical extent as the second wall member, thereby reducing weight of the partition.

The cavity can be used for the installation of cabling for power and In flight Entertainment (IFE) services.

The cavity is preferably open above the location where the IFE screen or monitor is located to allow heat created thereby to rise up through the cavity and exit through its opening into for example ambient conditions above the divider. Other associated electric or electronic components may also have the heat generated thereby dissipated in a similar manner.

The class divider further includes a plinth formation 160 on which one or more of the first wall member 110, the second wall member 120 and the support frame 140 are directly or indirectly mounted or mountable. The plinth formation 160 provides a stable base for the mounting of the first wall member 110, the second wall member 120 and the support frame 140. The purpose of the plinth is structural, specifically to provide lower mounting locations for units, where the aircraft does not have mounting tracks. The plinth spreads the load from the tracks into the units above, and allows them to be positioned wherever required, instead of having to be mounted directly above a pre-existing track location.

In a preferred embodiment, the plinth formation 160 includes seat track attachment formations 170 for attaching the class divider 100 to tracks on the floor (not shown) of the aircraft. The attachment formations 170 can be used to attach the class divider to the same seat tracks that the adjacent seats or seating arrangements 500 a&b are attached to, thereby negating the requirement of providing additional track formations (and additional weight).

The plinth formation further includes a pedestal formation 165 suitable for mounting of a monitor and/or a tray table arrangement, as shown in FIG. 1. It is also envisaged that a pedestal formation 165 could be mounted independently in association with the class divider 100.

The pedestal formation 165 is associated with the aisle seat located behind the class divider 100. The pedestal formation 165 is located adjacent the aisle allowing access by a passenger to an aisle seat disposed behind the class divider 100. The pedestal formation 165 is also located adjacent to the head-strike zone for the seat or seating arrangement that the pedestal formation 165 is associated with.

A tray table arrangement 270 as well as a video monitor 230 and other in-flight entertainment controls and accessories is mounted or mountable on the pedestal formation for presentation to a passenger.

The class divider 100 further includes bin rail attachment formations 180 for attaching the class divider 100 to bin rails (not shown) of an aircraft, or any other high level mounting rails found in an aircraft, to thereby provide additional rigidity and/or stability to the class divider 100 when installed.

In addition, it is envisaged that the class divider 100 can also include a floor proximity light fitting 190 for providing floor proximity lighting for guiding passengers along an aisle alongside the class divider 100. The class divider also can include an in-use light fitting 195 for providing an indication that something onboard the aircraft is in use.

Typically in large aircraft, channels (not shown) run underneath the flooring, through which information and power cabling (not shown) can be routed for distribution throughout the aircraft.

The class divider further includes support formations 210 suitable for supporting a bassinet, in another embodiment can include a bassinet (not shown) itself. In a preferred embodiment, the bassinet is removably attachable to one or more of the first wall member 110 and the second wall member 120.

Preferably, the bassinet is pivotally coupleable to one or more of the first wall member, the second wall member, and the support frame in a removable manner, to move between a stowed position in which it is stowed out of the way of passengers seated behind the class divider 100, and a folded out position in which it is capable of supporting a sleeping infant. It is envisaged that the bassinet will be preferably supported by the support frame, or by a thickened first or second wall member adapted and configured to be capable of supporting the additional weight of an infant.

Figure 14:
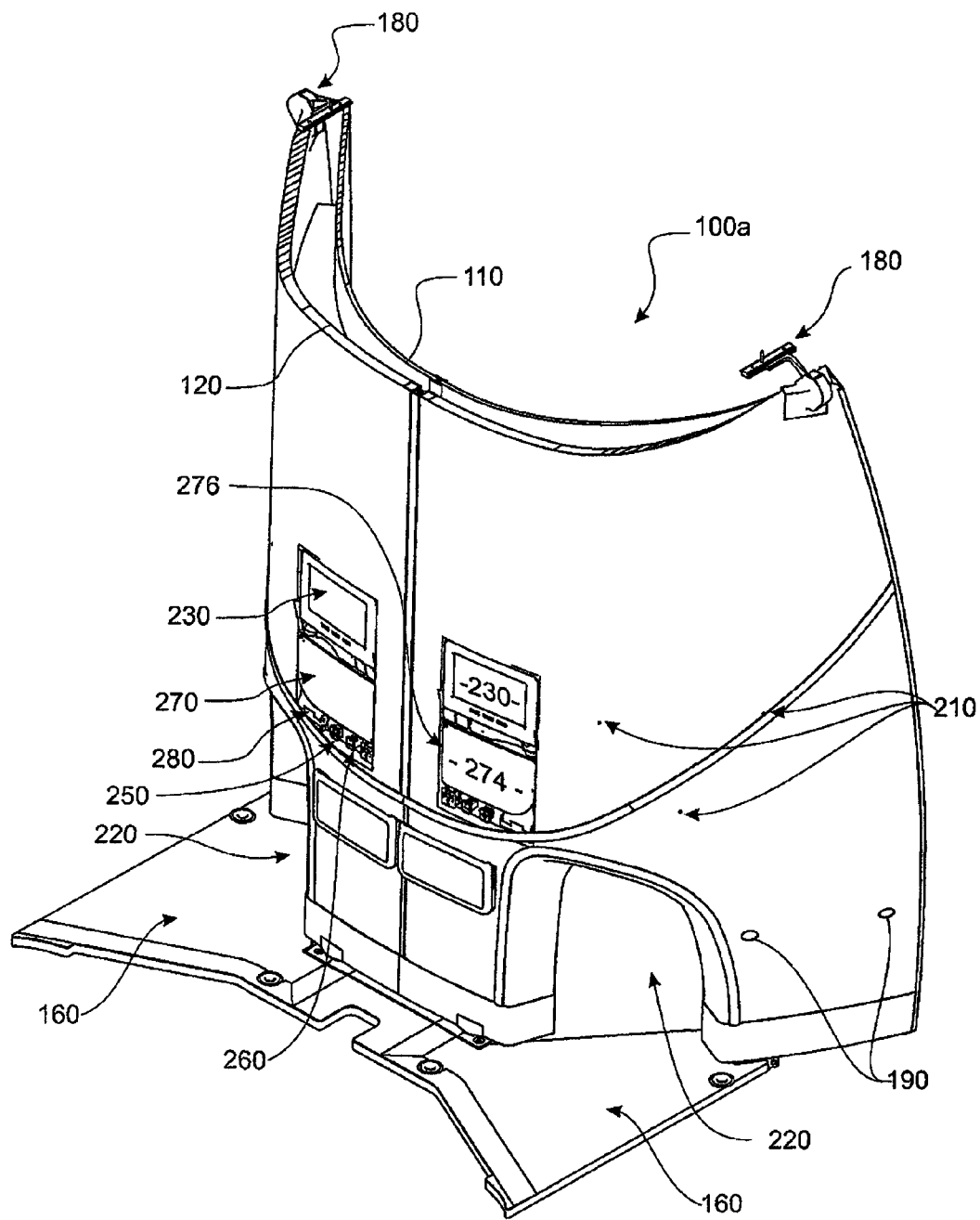
FIG. 14: shows a top rear perspective view of an inboard class divider.

In a preferred embodiment, the class divider 100 defines one or more apertures 220 (as shown in FIG. 14 for the inboard arrangement) or recesses 222 (as shown in FIG. 1 for the outboard arrangement), suitable for receiving at least part of the legs (not shown) of a passenger (not shown) seated in an adjacent seating arrangement 500 disposed behind the class divider 100, to allow a passengers legs to be at least partially extended underneath the seating arrangement 501 in front of the class divider 100. The aperture 220 could also be a recess (not shown), or a cut-out (not shown). It is envisaged that where the seats or seating arrangements 500 behind the class divider are arranged in a staggered or offset formation, then the aperture 220, will be aperture will be disposed in an offset fashion towards one side of the class divider 100.

Another feature included on the rear side of the class divider 100 is a video monitor 230 for passenger entertainment and information. It is envisaged that the monitor will preferably be as thin as possible, and will include one of a Liquid Crystal display (LCD) screen; a plasma screen monitor screen, an Organic Light Emitting Diode (OLED) screen, or a three dimensional display screen. In a preferred embodiment, the monitor will be mounted to a pivotally moveable bracket (not shown) that will allow it to be moved out of a recess 240 in the first wall member 110 or second wall member 120 and pivoted about at least two axes of rotation for optimum convenience of viewing by a passenger. The monitor may alternatively be mounted in a manner to remain static.

The class divider 100 also includes an electrical supply socket 250 for supplying power to portable electronic device, and for charging of such devices, and a data connection socket 260 such as a Universal Serial Bus (USB) socket for allowing such devices to be networked with each other, to the In flight entertainment system (for example for playing music through the seat speakers), or with the Internet via an Internet portal located elsewhere on the aircraft. Preferably, the electrical power supply socket 250 is adapted and configured for supplying one or both of DC voltage and AC voltage.

Further, the class divider includes a tray table arrangement 270. The tray table arrangement includes a pair of tray members 272 moveable by virtue of a tray table support mechanism 280. Each tray member 272 defines a pair of opposed major faces 274.

The tray member 272 are moveable between a deployed position, in which at least one or both of the tray members 272 are usable by a passenger in seat 500 as a support for items, and a stowed position in which the tray table 270 is stowed in a position less intrusive to a passenger. The tray members 272 are stowable in a tray recess 276 in the second wall member 120 when in their stowed position.

In the stowed position it is envisaged that the major faces 274 of the tray members 272 will abut each other, and at least one of the major faces 274 will abut the rear second wall member 120 in the tray recess 276.

The tray table support mechanism 280 allows the tray members 272 to be pivotally moveable about a plurality of axes relative to the second wall member 120 to be deployed in a wide variety of configurations.

Where in the foregoing description reference has been made to elements or integers having known equivalents, then such equivalents are included as if they were individually set forth.

Although the invention has been described by way of example and with reference to particular embodiments, it is to be understood that modifications and/or improvements may be made without departing from the scope or spirit of the invention.

In addition, where features or aspects of the invention are described in terms of Markush groups, those skilled in the art will recognise that the invention is also thereby described in terms of any individual member or subgroup of members of the Markush group.

The invention claimed is:

1. A class divider in an aircraft that provides leg room for a passenger sitting in a seat in a first class of the aircraft and adjacent said class divider, into an adjacent second class of the aircraft, the class divider comprising;
 a first wall member that is positioned to face the second class and adjacent to which a seat in said second class is placed, and
 a second wall member that is positioned facing said first class and adjacent to which said passenger can be positioned when sitting in said seat in said first class, said second wall member and said first wall member defining a cavity therebetween,
 wherein the class divider has an aisle end located adjacent an aisle of the aircraft and a non-aisle end located opposite from the aisle end and is located between the first class and the second class of the aircraft,
 wherein said first wall member is contiguous with said seat in said second class,
 wherein the first and second wall members allow at least the feet of a passenger sitting in said seat in said first class to be located under said seat in said second class,
 wherein said first wall surrounds and extends around a rear and at least a majority of a side of said seat in the second class,
 wherein the first wall member defines a concave forward facing surface when viewed from above, and the second wall member defines a convex rear facing surface when viewed from above, and
 wherein the wall members, at the aisle end, are angled toward a front end of the aircraft.

2. A class divider as claimed in claim 1, wherein the class divider extends from the cabin floor to at least 1.8 m above the cabin floor.

3. A class divider as claimed in claim 1, wherein the first wall member has a lower edge that is of a shape to follow the contour of at least part of the seat in said second class and extends upwardly from the seat in said second class.

4. A class divider as claimed in claim 3, wherein an interface between said lower edge and the seat in said second class forms a seal to said cavity.

5. A class divider as claimed in claim 1, wherein the second wall member extends upwardly from the cabin floor.

6. A class divider as claimed in claim 1, wherein the cavity is open at the top of the class divider.

7. An aircraft that includes a class divider as claimed in claim 1.

8. A class divider as claimed in claim 1, wherein the forward facing surface of the first wall member and the convex rear facing surface of the second wall members are curved substantially parallel to each other.

9. A class divider as claimed in claim 1, wherein the class divider includes a support frame at least partially extending between the first wall member and the second wall member.

10. A class divider as claimed in claim 9, wherein the support frame is for supporting one or more selected from said first wall member and said second wall member.

11. A class divider as claimed in claim 9, wherein the class divider includes a plinth formation on which one or more of the first wall member, the second wall member and the support frame are directly or indirectly mounted or mountable.

12. A class divider as claimed in claim 11, wherein the class divider includes a tray table supported by one of said first and second wall members moveable between:
   a deployed position in which it is usable by a passenger as a support for items, and
   a stowed position in which the tray table is stowed in a position less intrusive to a passenger.

13. A class divider as claimed in claim 11, wherein the plinth formation includes a pedestal formation suitable for mounting of and presenting for use by a passenger, a monitor and/or a tray table arrangement.

14. A class divider as claimed in claim 13, wherein, in use, the pedestal formation is located adjacent the aisle.

15. A class divider as claimed in claim 13, wherein the pedestal formation is, in use, associated with one or more seats or seating arrangements.

16. A class divider as claimed in claim 13, wherein the pedestal formation is located to be in use adjacent to a head-strike zone for the seat or seating arrangement that the pedestal formation is associated with.

17. A class divider as claimed in claim 1, wherein the class divider includes seat track attachment formations for securing the class divider to seat tracks of an aircraft.

18. A class divider as claimed in claim 17, wherein the seat track attachment formations are mounted to the plinth formation.

19. A class divider as claimed in claim 1, wherein the class divider includes bin rail attachment formations for attaching the class divider to overhead bin rails of an aircraft.

20. A class divider as claimed in claim 1, wherein the class divider includes support formations suitable for supporting a bassinet.

21. A class divider as claimed in claim 20, wherein the class divider includes a bassinet.

22. A class divider as claimed in claim 21, wherein the bassinet is pivotally coupleable to one or more of
   the first wall member,
   the second wall member,
   the support formations.

23. A class divider as claimed in claim 22, wherein the bassinet is supported by the support frame.

24. A class divider as claimed in claim 21, wherein the bassinet is adapted to be moveable between
   a stowed position in which it is stowed out of the way of passengers seated behind the class divider, and
   a folded out position in which it is capable of supporting a sleeping infant.

25. A class divider as claimed in claim 1, wherein the class divider defines one or more selected from a recess, a cut-out and an aperture, suitable for receiving at least part of the legs of a passenger seated in an adjacent seating arrangement disposed behind the class divider arrangement, to allow a passenger's legs to be located in said recess, cut-out or aperture.

26. A class divider as claimed in claim 25 wherein the said one or more selected from a recess, a cut-out and an aperture extends upwards from floor level.

27. A class divider as claimed in claim 1, wherein the seat in the first class and/or the seat in the second class of the aircraft does not/do not face parallel to the longitudinal direction of the aircraft body.

28. A class divider as claimed in claim 1, wherein the class divider is generally "V" or "U" shaped in plan view.

29. A class divider in an aircraft that provides leg room for a passenger sitting in a seat in a first class of the cabin of the aircraft and adjacent said class divider, into an adjacent second class of the aircraft where a seat in said second class is positioned contiguous to said class divider, wherein the class divider is located between said first class and said second class of the aircraft, the class divider comprising;
   an aisle end located adjacent an aisle of the aircraft and a non-aisle end located opposite from the aisle end,
   a primary partition wall member that extends upwardly from cabin floor level and that is positioned facing said first class and adjacent which said passenger can be positioned when sitting in said seat in said first class,
   a secondary partition wall member that extends from divider contiguous portions of said seat in said second class and defines a cavity between the partition wall members,
   wherein the primary partition wall member is adapted and configured to allow at least the feet of the passenger to pass there through to be located under said seat in said second class, the seat in the second class bridging space between the secondary partition wall member and the cabin floor,
   wherein the class divider has a concave forward facing surface when viewed from above, configured to surround and extend around a rear and at least a majority of a side of said seat in said second class the second wall member defines a convex rear facing surface when viewed from above, and
   wherein the wall members, at the aisle end, are angled toward a front end of the aircraft.

30. A class divider as claimed in claim 29, wherein the secondary partition wall member extends to the same height as the primary partition wall member.

31. An aircraft that includes a class divider as claimed in claim 29.

32. A class divider as claimed in claim 29, wherein the primary and secondary partition wall members are spaced less than 500 mm apart.

33. A class divider as claimed in claim 29, wherein the seat in the first class and/or the seat in the second class of the aircraft does not/do not face parallel to the longitudinal direction of the aircraft body.

34. A class divider as claimed in claim 29, wherein the class divider is generally "V" or "U" shaped in plan view.

35. A class divider for dividing adjacent seating areas of a passenger vehicle having different types of seating arrangements,
   said class divider located between two areas each having a different class of seating arrangement, a second class being located in said vehicle forward of a first class,
   said class divider comprising:
   an aisle end located adjacent an aisle of the aircraft and a non-aisle end located opposite from the aisle end,
   a first wall member that defines one or more selected from a recess, a cut-out and an aperture, suitable for receiving at least part of the legs of a passenger seated in an adjacent seating arrangement disposed behind the class divider, to allow the passenger's legs to be at least partially extended underneath the seating arrangement in front of the class divider and through said one or more selected from a recess, a cut-out and an aperture,
   a second wall member that is positioned facing said first class and adjacent to which said passenger can be positioned when sitting in said seat in said first class, said second wall member and said first wall member defining a cavity therebetween, said one or more selected from a recess, cut-out, or aperture located in an offset fashion towards one side of the class divider, wherein the class divider is configured to be contiguous with the seating arrangement disposed in front of the class divider, and to surround and extend around a rear and at least a majority of a side of said adjacent seating arrangement in from of the class divider, wherein the first wall member defines a concave forward facing surface when viewed from above, and the second wall member defines a convex rear facing surface when viewed from above, and wherein the wall members, at the aisle end, are angled toward a front end of the passenger vehicle.

36. A class divider as claimed in claim 35, wherein the said one or more selected from a recess, a cut-out and an aperture extends upwards from floor level.

37. A class divider as claimed in claim 35, wherein the class divider comprises a second wall member secured to the first wall member.

38. A class divider as claimed in claim 37, wherein the first wall member is mounted forward of the second wall member.

39. A class divider as claimed in claim 38, wherein the first and second wall members have complementary nesting curved shapes respectively as viewed from above.

40. A class divider as claimed in claim 35, wherein seats of the seating arrangement in the first class and/or seats of the seating arrangement in the second class of the aircraft does not/do not face parallel to the longitudinal direction of the aircraft body.

41. A class divider as claimed in claim 35, wherein the class divider is generally "V" or "U" shaped in plan view.

* * * * *